UNITED STATES PATENT OFFICE.

GEORGE W. B. NEFF, OF SANDY, UTAH.

LEAK-STOPPING COMPOSITION.

1,343,150.  Specification of Letters Patent.  Patented June 8, 1920.

No Drawing.   Application filed August 2, 1919. Serial No. 315,014.

*To all whom it may concern:*

Be it known that I, GEORGE W. B. NEFF, a citizen of the United States, residing at Sandy, in the county of Salt Lake and State of Utah, have invented new and useful Improvements in Leak-Stopping Compositions, of which the following is a specification.

This invention relates to a filling composition, especially adapted for stopping leaks in automobile radiators, although it is also susceptible of use in other connections.

The object of the invention is to provide a filling composition, which may be placed within a radiator, where it will form into a hard cement-like substance which will not be affected by heat and which will also contain a lubricant to preserve the radiator by the prevention of rust and thereby prevent enlargement of the opening filled.

The invention consists of the combination set forth in and falling within the scope of the appended claims and includes the following ingredients combined in the proportions stated:

Powdered linseed meal _____ 90 lbs.
Powdered manganese dioxid _____ 10 lbs.
Oil of citronella _____ 1 qt.

These ingredients are thoroughly mixed to form a plastic substance, which may, if desired, be changed into a liquid form by the addition of water. Air striking the composition will transform it into a hard cement-like substance, which is not affected by heat and which will form an efficient filling for the stoppage of leaks.

I claim:

1. The herein described composition consisting of powdered linseed meal, 90 pounds, powdered manganese dioxid, 10 pounds, and 1 quart oil of citronella.

2. The herein described composition consisting of powdered linseed meal, powdered manganese dioxid, and oil of citronella.

In testimony whereof I affix my signature.

GEORGE W. B. NEFF.